Feb. 7, 1933.  L. McCANDLESS  1,896,751
LIQUID DISPENSING APPARATUS
Filed May 13, 1929   3 Sheets-Sheet 1

Inventor:
Lyon McCandless
By Walter A. Knight and
Bennett B. Knight
Attys.

Patented Feb. 7, 1933

1,896,751

UNITED STATES PATENT OFFICE

LYON McCANDLESS, OF ROCHESTER, PENNSYLVANIA, ASSIGNOR TO THE WAYNE PUMP COMPANY, OF BALTIMORE, MARYLAND, A CORPORATION OF MARYLAND

LIQUID DISPENSING APPARATUS

Application filed May 13, 1929. Serial No. 362,840.

This invention pertains to liquid dispensing apparatus, and more particularly to that type of gasoline dispensing device known as meter pumps.

The so-called meter pumps now in use have been evolved after much experimentation lasting over a considerable period. The earliest commercial use of dispensing apparatus of this type in connection with the handling of gasoline probably was effected to indicate the approximate number of gallons of gasoline transferred to or from storage tanks in bulk storage plants. The next step was the use of meters in connection with the retailing of gasoline when it was desired to deliver the gasoline from a reservoir directly to a point removed from and at a considerably lower level than said reservoir. The first real commercial development in retailing gasoline by meter pumps was made possible by the use of air pressure as a prime mover of the gasoline, this air pressure being introduced into the gasoline storage tank for causing the gasoline to be forced through a remote measuring meter. The air pressure could be easily controlled so that a constant pressure was kept on the liquid at the meter which made it possible for an accurate operation of said measuring meters. This system, though accurate and comparatively easy to handle, had many disadvantages in that the tanks which must be constructed to stand the necessary air pressure were expensive to manufacture, and then there was the obvious hazard of mixing gasoline and air under pressure. The cost of compressing the air, the difficulty experienced by the freezing up of water of condensation produced by the expanding compressed air, and the expensive and complicated piping system necessary for this type of installation, all contributed to making this type of system more or less prohibitive in price, especially when competing with the cheaper visible type pumps.

The meter system however was continually improved, and the next developments came along two lines; one with the self-contained power plant in the meter housing, and the other including a centrally located power plant supplying a number of dispensing pumps in a system. In this latter system, the discharge from a rotary or other mechanical pump connected all the meters so that gasoline could be dispensed selectively from any one of the meters, and the constant pressure necessary for the accurate operation of the measuring meters was maintained by means of a relief valve which communicated to the storage tank through an overflow pipe or a by-pass around the pump. This system had an advantage in that by means of the relief valve and overflow connection, a constant pressure was very easily maintained, but the chief disadvantage was that a separate power plant was required for each grade of gasoline which was dispensed in the service station—a decidedly impractical system now because in a great many service stations no two pumps in the entire battery are used to dispense the same grade of gasoline. Another disadvantage was that if the power plant was made sufficiently large to take care of all the meters dispensing simultaneously, a considerable waste of power occurred when only one pump was discharging at a time.

The meter system had a very serious competitor in the so-called visible type of gasoline dispensing apparatus, which type is easy to handle and operate, is comparatively accurate and is inexpensive to build and maintain. However, the meter system has many advantages over other gasoline dispensing systems, a few of the same being as follows: Only one pipe connection is necessary to the supply tank or reservoir, and while a piston type pump requires only one connection, the visible type dispensing apparatus requires two, namely, a suction and an overflow pipe.

Another advantage is that an unlimited number of gallons of liquid may be dispensed by the operator up to the capacity of the tank in any operating cycle. In this respect, the meter system contemplated is decidedly more advantageous than the piston pump type having several cylinders. With this latter type, a stop must be made to disengage one cylinder and engage the other, and while this stop is only momentary, it is lost time, and the operating cycle is confined to each gallon dispensed instead of the total amount dispensed. In the visible type, it is first necessary to fill the visible container with any number of gallons up to its capacity, usually ten gallons, and then dispense any number of those gallons disposed in said visible container, the point of discharge being necessarily below the supply point from the measuring chamber.

Still another advantage of the meter system is that flow of gasoline is controlled at the nozzle of the discharge hose, which means that spillage and consequent fire hazard is practically eliminated since the operator, who has entire control of the flow of gasoline, can shut off the flow at any time and is in a position to see when a receptacle, such as an automobile tank, is filled. Also, the five gallon cycle of the piston type pumps and the earlier visible pumps produced a result whereby the motorist bought gasoline in five gallon lots as he was unwilling to wait while that part of the cycle was completed which did not dispense gasoline into his car in unlimited amounts. This advantage of control at the nozzle to dispense any number of gallons of gasoline is of course a valuable sales feature, and besides being more convenient, is decidedly more accurate than the eye measurement necessary in the later type of visible pumps.

Yet another advantage in nozzle control is that the hose is not drained since the control valve is at the end of the hose. This of course eliminates the loss of time required in draining the hose and effects more accurate measure since considerable time is required to completely drain the contents of the usual 10-foot hose into the customer's tank, and in reality in practice the hose is never completely drained. Further, the measurement of the number of gallons dispensed is at the end of the hose since the hose is always filled as opposed to having to fill a measuring chamber remote from the point of discharge, as in the visible pump.

A further advantage of the nozzle control is evidenced by a comparison with the wet hose of the visible pumps, considering that the rate of discharge depends among other factors on the resistance offered to the liquid in its passage from the pump cylinder to, for instance, the car tank, and for this reason, a large and cumbersome hose has been employed to give free passage to the liquid. As an illustration, the most common size hose in use today in the visible type pump is of 1¼" inside diameter, while with the present meter system, it is possible to use a hose of ¾" inside diameter, which hose is of course more easily handled since it weighs considerably less and is more flexible. The piston pumps are able to use a smaller hose than the visible since this factor is not so much of an influence on the speed of delivery; however, if carried too far, it will result in an increased amount of work necessary to pump the gasoline. A comparison of the meter pump hose and the visible pump hose will readily disclose a distinct saving in cost for the same results accomplished, together with a decided ease in handling.

A still further advantage of the meter system over other gasoline dispensing systems is that the gasoline is dispensed under pressure rather than by gravity alone, which means that high tanks can be readily filled and the hose nozzle carried to relatively inaccessible points, and while piston pumps deliver gasoline under pressure, the hose must be drained, which nullifies the other advantage to a large extent.

Yet a further advantage in the pressure type pump is that an audible indicator may be associated with the measuring device, for instance, bells may have cooperative relation with the meters and be arranged in such a way as to ring with each gallon dispensed.

An additional advantage is that the meters are provided with a totalizing counter which enables the station agent to keep an accurate record of the gasoline dispensed over any period; a motorist's tank may be filled without regard to the number of gallons to be used, and the record of this number is visible to the customer and the operator. This of course is true with the eye measure of the visible type pump only to the extent of the capacity of the usual measuring chamber.

Another additional advantage is that the meter system is or can be made the fastest means of dispensing gasoline in existence since its speed is limited only by the capacity of the inlet of the tank which is to receive the dispensed gasoline.

The meter type pump with the self-contained power plant besides having the above enumerated advantages has the advantage that only the motor for the particular pump in use is working when any dispensing apparatus is being operated.

Another advantage is that on account of connections, such as by-pass means between the pump passage and the suction line, only one connection, that is, the suction line, is required to each tank.

Yet another advantage is its adaptability to replace other installations. In any pump installation however obsolete, there is a suction line to the tank or reservoir so that it is possible to change the obsolete pump installations over to this type of meter pump with no substantial change in pipe connections. This is a very important factor since in many cases the piping is embedded in or covered by a concrete base.

A further advantage is that with the self-contained meter type pump, the pump unit may be moved from place to place without installing piping changes. In many of the meter pumps now in use, difficulty has been encountered in the use of by-pass valves to maintain a sufficiently high constant pressure to operate the meters under their most favorable operating conditions. This disadvantage has been met by employing a relief valve with an overflow connection in the self-contained meter unit, and it is an object of this invention to provide a pump unit employing a by-pass connection having a pressure regulating device associated therewith, which device is so constructed as to prevent vibration of the valve without the sacrifice of operating efficiency.

Another object of this invention is to provide a dispensing apparatus which successfully meets all service and manufacturing requirements and which embodies all of the advantages above enumerated and successfully overcomes the disadvantages usual in this type of systems as well as those of other dispensing systems.

Another object is to provide a dispensing device having a plurality of discharge means which may be successively or simultaneously operated, the same cooperating with means whereby one of said discharge devices may be operated and will permit operation of the pump regardless of the disposition of the other discharge means.

A further object is to provide by-pass means associated with the pumping unit, which by-pass is arranged to prevent chattering, yet satisfactorily operates to divert the flow of liquid in the system under given conditions whereby no further liquid may be pumped from the reservoir.

Another object is to provide a meter system whereby it is possible to prevent the maintaining of excessive temperatures in the system.

A still further object is to provide a meter system which effectively eliminates vapor in the system whereby an accurate measuring will be obtained of the liquid dispensed.

Yet a further object is to provide gasoline dispensing apparatus having visible indication means of the liquid contained in or being discharged from the system, which means is also provided with means for automatically removing air or vapor trapped or produced in the system.

With these and various other objects in view, the invention may consist of certain novel features of construction and operation, as will be more fully described and particularly pointed out in the specification, drawings and claims appended hereto.

In the drawings, which illustrate an embodiment of the device and wherein like reference characters are used to designate like parts—

Referring first of all to Figures 1 to 4 inclusive, the metering dispensing apparatus is provided with a base 10 to which is secured an upstanding standard or casing 12 provided with a head 14 supporting meters 16, above which is secured the dome 18 providing a support for any usual indicating insignia, which may be secured to the collar 20. The meter pump system consists essentially of a suction line 22 which is connected to any source of supply (not shown) and is provided with a readily removable strainer 24 and a check valve 26 which may be of any desired type, which check valve prevents flow of gasoline from the system back to the source of supply, said check valve being located in the suction line ahead of the pump 28.

The pump 28 is provided with a pump shaft 30 having a sprocket 32 provided thereon, said sprocket being engaged by the chain 34 cooperating with sprocket 36 of the electrical motor or other prime mover 38. Another sprocket 40 is provided on the shaft 30, the said sprocket meshing with the chain 42 secured to the idler shaft 44, said shaft having a suitable clutch connection 46 whereby the handle 48 may actuate the shaft 44 to thereby operate the pump 28. The pump casing adjacent the upwardly extending portion of the suction line 22 is provided with an air dome 29, said dome being inserted to absorb expansion of the liquid in the system, motor pulsations, shocks, etc. which might affect the accurate operation or might even damage the system.

The gasoline or other liquid is forced by the pump upwardly through the suction line 22 (continued) to the union or T-connection 50, which directs the liquid to the valves 52, which valves control the flow of liquid to the respective meters 16, which meters 16 are actuated by the liquid passing therethrough to the respective connections 53 disposed between the meters and the sight glasses 54, which sight glasses are connected to the discharge hose 56 provided with the nozzle 58. The nozzles are provided with valve mechanism, indicated generally at 60, the valve thereof being arranged to seat with the flow of liquid, said valve being operated by the pivoted lever member 62 carried by the hand-grip 64. The nozzle 58 is preferably provided with a flexible extension 66 for directing the liquid to any desired place.

Hooks 68 are pivoted to the casing 12 at 70 and provide means for supporting the nozzles 58 in an upright and convenient position, each hook being provided with a link 72 pivoted to the inner end thereof as at 74 and extending downwardly and pivoted to lever 76 of the valve 52. Said lever is secured to a shaft 78 provided with a cam 80 having engagement with a normally closed valve disc 82, said valve disc being provided with a valve stem 84 slidable in guide 86, the guide 86 forming a support for a spring 88 provided between the valve disc and said guide and tending to maintain the valve disc 82 in seated or closed position so that no liquid can normally pass through the valve 52. A stop 90 may be conveniently secured to the meter supply lines for limiting the position of the levers 76 of each of the valves 52.

Electricity is supplied to the motor through conductors incased in the conduit 92, the same being connected to the motor as at 94, the conduit extending upwardly to switch box 96, said switch box being provided with a switch member 98 adapted to control the operation of the motor through movement in a substantially vertical direction. The conduit extends from the switch box 96 upwardly to a switch control 100 which controls operation of the light connections 102 and 104. The switch member 98 is controlled through the rod 106 which extends upwardly from said switch member to a crosshead 108 having outwardly extending members 110 thereon, which members are respectively disposed in slots 112 provided in the inner ends of each of the hook members 68 so that it will be seen that by raising the outer end of the hook member 68, the same pivots about the pivot point 70, repressing the crosshead 108 and consequently the operating rod 106, which in turn causes operation of the switch member 98 to supply power to the motor 38 thereby causing operation of the pump.

Contractile springs 114 may be disposed between the casing 12 and the inner ends of the hooks 68, normally urging the inner ends of the hooks downwardly to thereby operate the switch 96, the springs being of such weight however that when the nozzles 58 are hung on their respective hooks 68, the action of the springs will be overcome, causing closure of the switch 96. The use of springs 114 is of course optional as it may be desired to eliminate such springs to permit operation by direct actuation by the operator only, that is, the pump operator must raise the outer ends of the hooks 68 to depress the rod 106.

Figure 5:
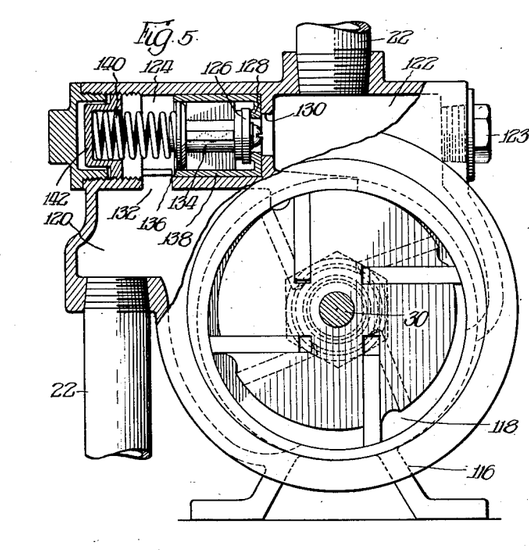
Figure 5 is an enlarged fragmentary sectional elevation of the pump and non-chattering by-pass connection.

Referring now to the pump and by-pass valve particularly illustrated in Figure 5, it will be seen that the pump is of the rotary type driven through suitable gearing, already described, at the speed producing the capacity required. For instance, for comparative figures it might be said that the speed is approximately 490 R. P. M. in the double meter system as contrasted to the speed of 420 R. P. M. in the single meter system. The pump 28 includes a suitable casing 116 which supports the operating shaft 30 provided with a suitable rotor 118, the rotor being operable to draw gasoline or other liquid through the suction line 22 where it passes through the chamber 120, being forced through the housing by means of the rotor 118 to the chamber 122 and thence upward through the suction line 22 to the meters, a plug 123 being shown in said chamber 122 in the place normally occupied by an air dome or expansion chamber, as shown at 29 in Figure 1. The casing 116 is provided with a valve chamber 124 containing the valve 126 shown closed on the seat 128, preventing flow of liquid through the passage 130 past the seat 128, through the passage 132 to the pump chamber 120. The valve disc 126 is provided with a stem 134 which in turn is provided with a supplementary disc 136 sliding within and normally closing communication through the sleeve 138 provided on the valve seat 128. A spring 140 is provided between the pressure disc 136 and an adjustment 142 for said spring, the spring urging the valve 126 to closed position.

The relief valve is built in this manner for the distinct purpose of preventing chattering and effective to secure proper operation. For example, in the usual type of by-pass valve, if the pressure rises a very small fraction of a point beyond that required to open the valve, the valve opens and closes immediately as soon as the pressure has fallen sufficiently for the spring to be able to close the valve. Thus it may be seen that the entire range of pressure necessary to open and close the by-pass or relief valve may be only a small fraction of a pound. This means that slight and unavoidable variations in the pressure in the seat will cause the by-pass valve to open and close very rapidly, producing a noisy or fluttering by-pass valve and a considerable variation in the pressure throughout the system. With my improved by-pass valve, this variation is much reduced and a considerably more constant pressure is maintained in the system at all times, even with both nozzles open. For example, if the spring 140 is set at 15 lbs. pressure and the area of the valve 126 is one square inch, then the valve 126 will open when the pressure becomes 15 lbs. per square inch. However, when the valve opens, the loosely fitting disc 136 offers considerable restriction to the flow of the liquid from the chamber 122 to the chamber 120. This has the effect of increasing the applied force on the valve 126 acting against the spring 140. Let us say then that the area of the disc 136 is made two square inches. Then neglecting leakage past the disc 136, there is now a 30 pound pressure on the spring 140 which of course permits the disc 136 to jump open since the spring is proportioned so that the additional pressure in the spring is sufficient to overcome the increased spring pressure caused by its higher compression. The valve then will remain open until the pressure falls below 7½ lbs. per square inch, which corresponds to 15 lbs. pressure in the system. Thus it will be seen that the spring is not likely to oscillate rapidly in the seat.

In actual practice, the pressure differentials will work out quite differently from that above described, it being understood that the above example is only given for the sake of clarity. For example, in actual practice consideration must be given to the loose fit of the disc 136 and the additional pressure in the spring caused by further compression as the additional pressure against the spring may almost be counterbalanced by the increased spring tension.

When two meters are operated in the system through discharge from both nozzles simultaneously, a different problem is encountered, as the flow is divided. If both nozzles are open at the same time serving two cars, it will be seen that this lessens the effective head against which the pump operates, so that there is a tremendous drop in pressure in the system. A typical example would be with the by-pass valve set for about 15 lbs.; then with one nozzle open the typical pump would be discharging to its full capacity, about 15 G. P. M. and the pressure in the system would drop to about 8 lbs. If the other nozzle is opened at the same time, the pressure drops to as low as 2 lbs. or 3 lbs., and each nozzle delivers approximately 7½ G. P. M. With both nozzles closed, the pressure for which the by-pass valve is set (15 lbs. in this instance) is maintained in the system.

This shows that in the usual double meter system employing two nozzles and two meters operating from the same pump, the meters are subject to being operated under a wide range of pressures. With extremely few exceptions, the meters employed in dispensing pumps of this type are of the nutating disc type and the accuracy of this type of meter depends largely on a constant head of pressure being maintained. It will therefore be seen that under the usual conditions, the meters will not measure the same when one nozzle is open as when both nozzles are open, because as stated above most meters will give entirely different measurements with a pressure of 8 lbs. than when used with a pressure of 3 lbs. If both meters are calibrated to deliver exactly five gallons when used singly, the error when used together with the reduced pressure may amount to twenty cubic inches or even many times more in five gallons. The permissible manufacturers' tolerance on this amount is only 3½ cubic inches.

Through the new system, the subject-matter of this application, it is possible to obtain the same accuracy irrespective of whether one or both nozzles are open. This is done by employing a larger capacity pump with the by-pass valve set for a pressure which will give a rate of flow which may be maintained whether one or both nozzles are open. In the improved system, the pump is by-passing about half of its capacity with one nozzle and is only completely closed when both nozzles are wide open.

For instance, in a case similar to the previous example, a pump with a capacity of thirty gallons per minute could be employed with the by-pass valve set at 15 lbs., then with one nozzle open, 15 G. P. M. would be delivered through the nozzle while the remaining 15 G. P. M. comprising the remainder of the capacity of the pump would be by-passing around the pump and the pressure would remain at 15 lbs. With both nozzles open, the pressure still remains at approximately 15 lbs, and 15 G. P. M. is being discharged from each of the two nozzles and the by-pass valve is closed.

To sum up, in the usual system the by-pass valve acts only as a relief valve and functions only when both nozzles are closed with the pump running. In the improved system, the by-pass valve acts as a pressure regulator in connection with the pump which has sufficient capacity to maintain the maximum pressure desired whether one or both nozzles are open.

Most gasoline dispensing pumps have some sort of means for showing when the system is full of gasoline, when gasoline is flowing from the device or when complete delivery has been made, this means usually being in the form of a glass cylinder. As has already been described, a sight glass 54 fulfilling these functions is disposed between each meter 16 and the dispensing hose 56, communication from the meter being through the conduit 53. It is essential that the sight glass, such as illustrated particularly in Figure 6, be kept full of gasoline and that all the air and/or vapor be kept out; the air entering the system through leaks in any part of the line, through a leaky suction line. Gasoline may break up into vapor and give the same appearance as air. Since the sight glass glass must be at substantially the highest point of the system in order to show immediately if any of the gasoline in the system drains back due to a leaky valve, such as the check valve 26, the air or vapor usually collects at that point and displaces corresponding amounts of gasoline, thus rendering the amounts discharged or registered inaccurate. In a meter system, the sight glass and the gasoline in it is continually under pressure and is never empty, as in the case of visible pumps, which is obvious as there is to be immediate delivery from the pumps of the meter type and also because gasoline once past the meter is measured by said meter. When the air has once collected in the sight glass, it may sometimes be removed by pumping more gasoline through said sight glass, although with the larger types of these glasses now coming into use, it becomes increasingly difficult, if not impossible, to remove the air in this manner.

Figure 6:
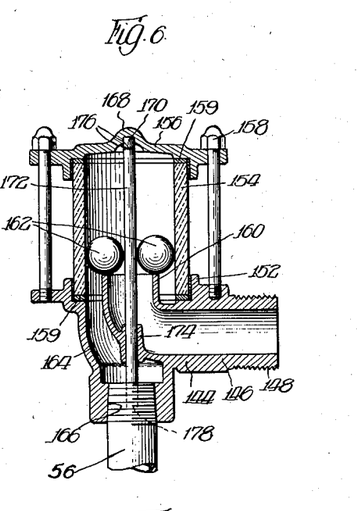
Figure 6 is an enlarged fragmentary sectional elevation of the sight glass embodying indicating means and air and vapor-eliminator.

In some cases, these glasses are equipped with valves at the top thereof in order to release the air and vapor manually, but this is objectionable in that the method is one of guesswork, the valve being permitted to remain open, the pump being in operation, until gasoline squirts out through the valve, in which case the fire hazard is very great. In the sight glass for use in applicant's meter pump, the base 144 is provided with an inlet portion 146 having a threaded portion 148 adapted to be secured to the conduit 52 by means of a collar 150. The base is provided with an upstanding shouldered portion 152 adapted to form a seat for the cylindrical glass container 154, a cap 156 secured to the base by means of threaded bolts 158 completing the sight glass assembly, it being understood that suitable gaskets 159 are disposed between the base and the top and the glass cylinder 154.

The conduit 146 extends upwardly as at 160 to a point within the glass 154 and preferably enters the glass at a point off of the vertical axis in order to provide greater turbulence, celluloid balls or floats 162 being provided for indicating the liquid flow within the glass. Conducting portion 164 is provided for draining the gasoline from the sight glass from around the upstanding portion 160, said portion 164 terminating in a threaded portion 166 forming means for connecting the hose 56 to said sight glass. The top 156 is provided with a raised portion 168 to which is threaded as at 170 a portion of tubing 172, which tubing extends vertically downwardly through the sight glass arrangement and through a suitable collar 174 provided in the upstanding portion 160 of the inlet conduit 146, the tubing 172 thence extending downwardly into the discharge passage or conduit 164. At the highest possible point in the tubing 172, a number of apertures 176 are provided permitting ingress to said tube.

The liquid then enters the sight glass through the inlet passage 146 and the upstanding portion 160, agitating the balls 162 indicating the liquid flow in the system, and thence passes downwardly through the passage 164 into the hose 56 and is discharged through the nozzle 58. If any air collects in the sight glass or should any vapor be formed, the liquid passing the lower opening 178 of the tube 172 forms a partial vacuum at this point, which is communicated through the tube 172 to the top of the sight glass by means of the apertures 176 so that any air or vapor collected will be drawn down into the discharging liquid and exhausted through the hose.

Figure 7:
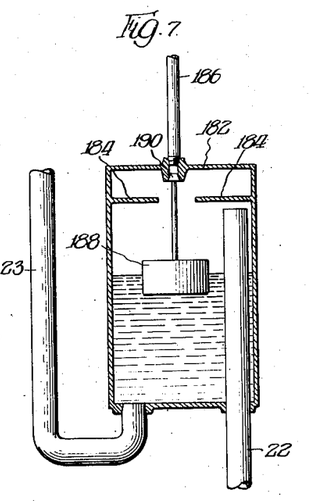
Figure 7 is a more or less diagrammatic elevation of the device which may be inserted in the suction line between the pump and the meter for the elimination of vapor from the gasoline to be measured and dispensed.

As air or vapor will register on most meters just as will liquid, it may be desirable to provide a device for the elimination of any air or vapor in the suction line between the pump 28 and the meters 16, which device may be inserted conveniently, for instance, at the fitting 180. The device may be of the character as illustrated in Figure 7, which consists essentially of a container 182 provided with any number of baffle plates 184 so disposed that the discharge portion of the line pipe 22 forces the gasoline against said baffle plates, releasing the gas or vapor upwardly, the liquid falling to the bottom of said container. A pipe line 186 is secured at the highest point of the container 182 and is connected to the atmosphere, a suitable vent, or to the supply tank or reservoir so that any vapor or air may either be vented or returned to the supply tank where it will be vented.

A float 188 is provided guided in its vertical movement by any suitable means and provided with a valve 190 adapted to close communication between the container and the conduit 186 after a suitable amount of gasoline is introduced to the container 182, after which continuation of operation of the pump will force the gasoline on through the continuation 23 of the suction line 22 to the meters.

Figure 8:
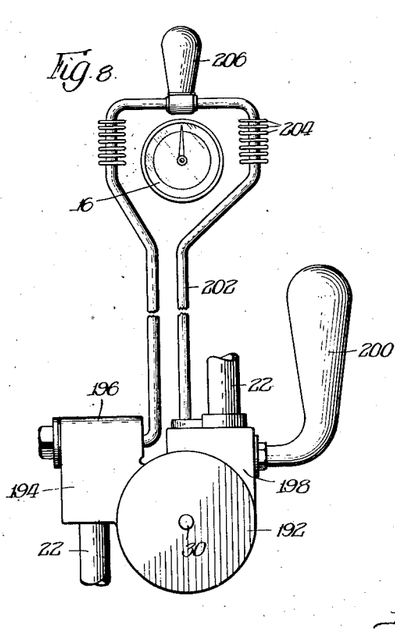
Figure 8 is a more or less diagrammatic elevation of a cooling system which may be employed in this type of pump, the same being shown as associated with the dispensing pump and the by-pass.

In pumps of the meter type with the by-pass valve open and the liquid circulating around the pump, some of the energy is dissipated in the form of heat so as to raise the temperature of the gasoline circulating. In addition, the suction action on the liquid and the turbulence caused by the pump may combine to change a part of the gasoline from liquid into gas, and for this reason, it may be found desirable to modify the pump and by-pass structure, such as illustrated in Figure 5, to include a cooling coil in the system. This may be done very easily by forming the pump casing with a main rotor-containing portion 192, through which the shaft 30 extends, said casing being provided with a portion 194 cooperating with the suction line 22 directly from the main reservoir and through which liquid is supplied to the pump, the portion 194 also having an upper part 196 for the reception of the by-pass valve which has already been described with respect to Figure 5. The pump casing is provided with another chamber 198 which may have connected thereto the expansion chamber 200, said chamber 198 being in communication with a portion of the suction line, extending upwardly to the meters, there being no connection between the valve containing portion 196 and the chamber 198; instead, said chambers are connected through piping or conduit 202 which may conveniently extend upwardly within the standard 12 to a high point in the system or above the meters 16, a portion of said conduit being provided with cooling fins 204 and also the expansion chamber 206 so that when the pump is by-passing liquid, instead of flowing directly from chamber 122 through the by-pass valve to the chamber 120 and thence around the pump (Figure 5), it flows from the chamber 198 upwardly through the conduit 202, downwardly through said conduit, through the valve chamber 196 to the chamber 194 and thence to the pump, and in this manner is cooled.

In the operation of the meter pump, let it be assumed that both nozzles 58 are hung on the hooks 68 and that the pump is therefore inoperative. Then if it be desired to dispense gasoline from say one of said nozzles, the nozzle is removed from the hook 68 and the outer portion of said hook is raised either manually or through the spring 114, thereby depressing the inner end, causing the crosshead 108 to be depressed. When said crosshead is depressed, the switch operating rod 106 is depressed to thereby operate the switch arm 98 of the switch 96 to close said switch to supply electricity to the motor 38, causing actuation of the pump 28 through the sprocket gearing 36, 34, 32. Depressing the inner end of the gear 68 also depresses link 72 which causes the corresponding valve 52 to be rendered operative by actuation of the cam 80 through the lever 76 and shaft 78, the cam causing depression of the valve 82 against the spring 88.

Figure 1:
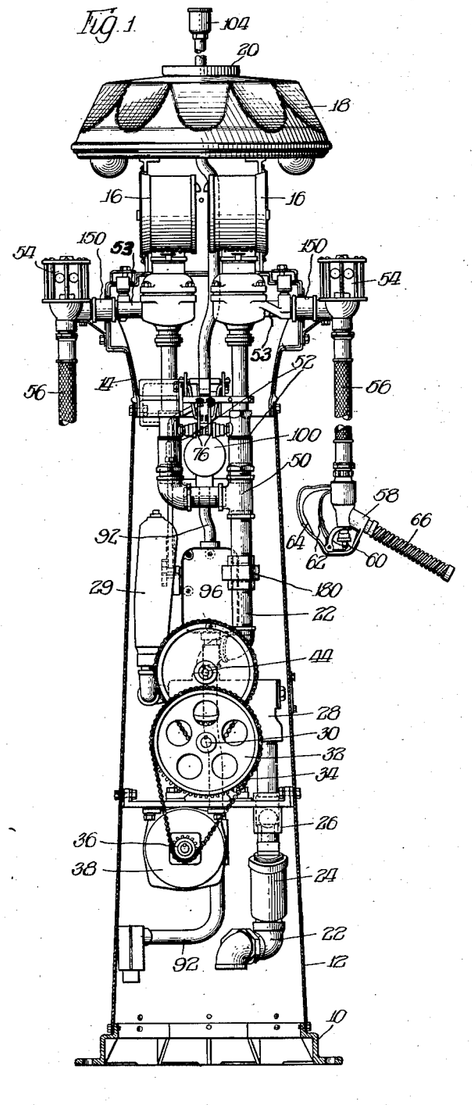
Figure 1 is a sectional side elevation of the meter pump, which is the subject-matter of this application.
Figure 2:
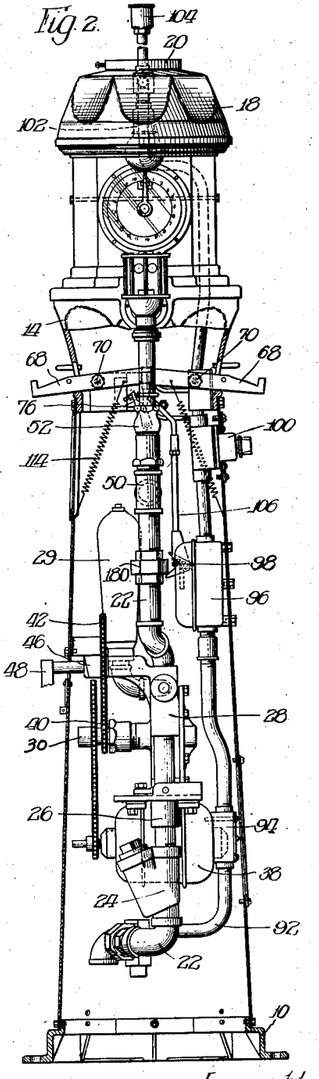
Figure 2 is a sectional elevation of the meter pump, the same being taken substantially at right angles to the view illustrated in Figure 1.
Figure 3:
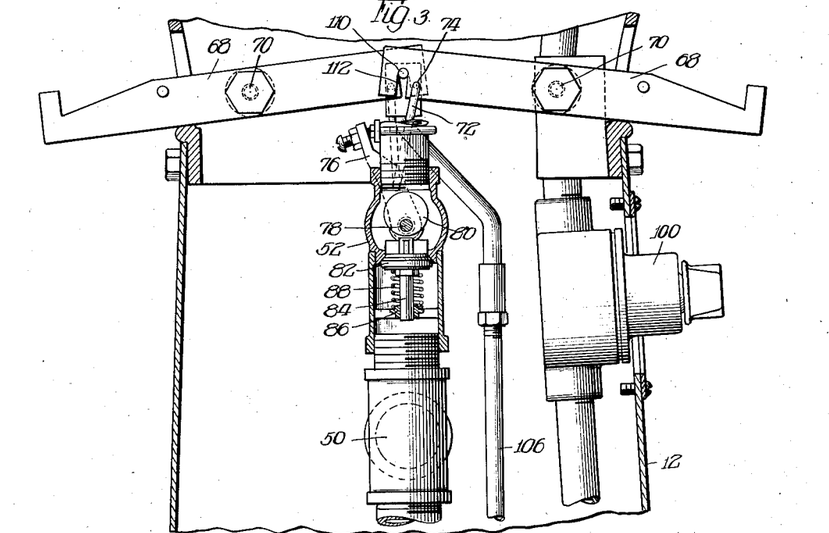
Figure 3 is an enlarged sectional elevation of a portion of the meter system, showing the controls for the motor and discharge in inoperative position, the same corresponding to the view shown in Figure 2.
Figure 4:
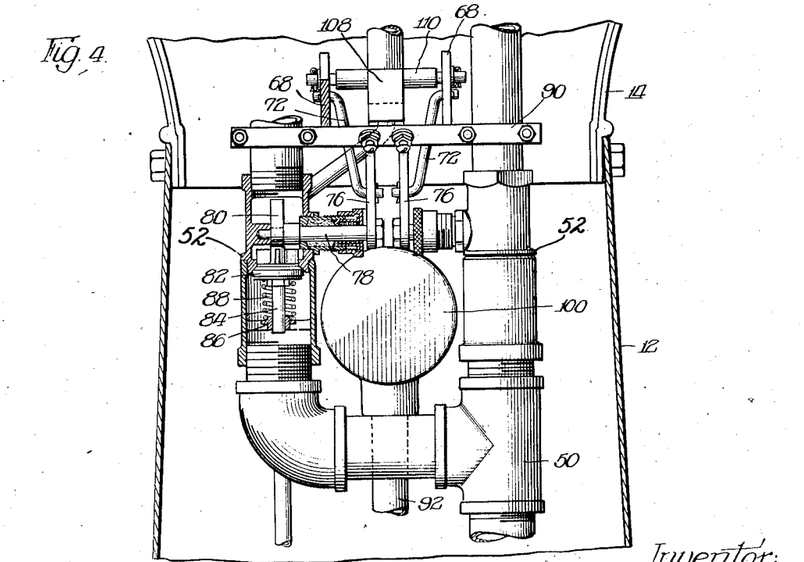
Figure 4 is an enlarged sectional elevation of a portion of the meter system, showing the controls for the motor and discharge in inoperative position, the same corresponding to the view shown in Figure 1.

Actuation of the motor and pump causes the gasoline or other liquid to be drawn through the suction line 22, upwardly through the strainer 24, through the check valve 26, through the pump casing to the upper portion of the suction line 22 and thence through the opened valve 52 to the corresponding meter 16, causing said meter to register, and thence outwardly through the passage 53 to the passage 146 and upwardly through the passage 160 into the sight glass 154, agitating the balls 162, the liquid then flowing downwardly through the passage 164 into the hose 56 and outwardly through the nozzle 58, it being understood that the handhold 62 has been operated to open the valve 60 to permit discharge of liquid from the flexible nozzle portion 66. It is of course appreciated that should any air be trapped in the sight glass, it is drawn through the apertures 176 into the power tube 172 by the vacuum formed at the end portion 178 thereof.

If the fitting 180 is replaced by the vapor eliminator, as illustrated in Figure 7, the operation is substantially the same with the exception that liquid is first forced against the baffles 184, the gas being expelled through pipe 186, the gasoline filling the chamber 182 until the float 188 is raised a sufficient amount to seat the valve 190, after which the gasoline is pumped through the extension 23 of the pipe 22 upwardly to the corresponding meter 16.

Any shocks incident to operation are absorbed in the system by means of the air dome 29 so that none of the joints or any of the working parts will be injured.

If it is desired to use the other hose, which up to this time has been described as in inoperative position, said hose is removed from its hook 68 and the inner end of the hook is depressed either manually or through its spring 114. Depression of the inner end of the hook will operate to open its valve 52 to thereby permit passage past the valve, through the meter and through the sight gauge and so to its nozzle 58. As has already been explained, when one hose is in operation and the other hose is brought into operation subsequently, there is a tremendous drop in pressure in the line, and ordinarily this would mean an inaccurate measure on the meters 16; that is, the meters would not measure the same when one nozzle is open as when both nozzles are open due to this variation in pressure. It is therefore very important that some means be provided whereby a correct measure is effected, and this is done in this case by employing a larger capacity pump with the by-pass valve set for a pressure which will give a rate of flow which may be maintained whether one or both nozzles are open. To do this, as has already been explained, when only one nozzle is being used, the by-pass valve is open and the pump is by-passing one-half of its capacity so that when the suction nozzle 58 is removed and put into operation, the only substantial effect on the system is that the by-pass valve is closed and the portion of liquid normally by-passing is discharged from said nozzle. It will be seen then that the by-pass valve where used in a double meter system is not a relief valve strictly speaking but is a pressure regulator so that the maximum pressure is maintained in the system regardless of how many nozzles are discharging. If then during operation one nozzle is rendering inoperative by closing the valve 60 while the other nozzle is discharging, and the inoperative nozzle is hung on the hook 68 to raise the inner end thereof, the only effect that this will have on the system will be to cause the valve 126 to open to by-pass one-half of the liquid pumped and to close the valve 52 on the closed nozzle side, which valve closes by operation of the cam 80 through the shaft 78 and the lever 76 through the link 72, as the loose connection between the crosshead and the inner end of the hook 68 causes no effect on the switch operating rod 106, and it is only when the other nozzle is rendered inoperative and hung on its hook 68 that the rod 106 is permitted to move upwardly to open the switch 96 to render the motor 38 inoperative.

It is to be understood that I do not wish to be limited by the exact embodiment of the device shown, which is merely by way of illustration and not limitation, as various and other forms of the device will of course be apparent to those skilled in the art without departing from the spirit of the invention or the scope of the claims.

I claim:

1. In liquid dispensing apparatus, the combination of an indicating device including a visible chamber, an upwardly directed inlet entering the bottom of said chamber at an angle to the axis thereof to produce greater turbulence therein, an outlet communicating to a draw off connection disposed in the bottom thereof, buoyant indicating means in said chamber to indicate the amount or flow of liquid therein, and a tubular member having an opening near the top thereof and extending into said outlet, the opening in said member being adjacent the top of said chamber whereby air, vapor and the like are drawn off from said chamber to said outlet by flow of liquid through said device.

2. In liquid dispensing apparatus, the combination of an indicating device including a visible chamber, an upwardly directed inlet entering the bottom of said chamber, an outlet communicating to a draw off connection disposed in the bottom thereof, buoyant indicating means in said chamber to indicate the amount or flow of liquid therein, and a tubular member having an opening near the top thereof and extending into said outlet, the opening in said member being adjacent the top of said chamber whereby air, vapor and the like are drawn off from said chamber to said outlet by flow of liquid through said device.

3. In liquid dispensing apparatus, the combination of an indicating device including a visible chamber, an inlet to said chamber and an outlet to said chamber, and means having an opening therein adjacent the top of said chamber and extending into said outlet whereby air, vapor and the like are drawn off from said chamber to said outlet.

4. In liquid dispensing apparatus, the combination of an indicating device including a visible chamber, indicating means in said chamber indicating the amount or flow of liquid therein, an inlet to said chamber and an outlet to said chamber, and means having an opening therein adjacent the top of said chamber and extending into said outlet whereby air, vapor and the like are drawn off from said chamber to said outlet.

5. In liquid dispensing apparatus, the combination of a supply line for connection to a source of liquid supply, a pump disposed in said line for pumping liquid therethrough, a measuring device in said line and connected to discharge means for determining the amount of discharge of said apparatus, a visible flow indicator in said discharge means, and means for eliminating air, vapor and the like from said visible flow indicator.

6. An indicator for wet hose liquid dispensing apparatus comprising a casing having a visible chamber through which the liquid passes, an inlet conduit adjacent the lower portion of the chamber terminating in an orifice acting to direct the liquid upward into contact with the top of the chamber from where it flows downwardly, an outlet conduit at the bottom of the chamber which receives the down flow of liquid and means forming a passage from the top of the chamber downwardly terminating adjacent the lower portion of the chamber in the down current of liquid acting to create suction to extract air or gas from the chamber.

7. An indicator for wet hose liquid dispensing apparatus comprising an open-ended transparent casing having a closure at both ends to form a visible chamber through which the liquid passes, an inlet conduit terminating in an upwardly directed orifice disposed substantially centrally of the lower end of the chamber acting to direct the liquid into contact with the upper closure from where it flows downwardly, an outlet conduit at the bottom of the chamber to receive the down flow of liquid and means forming a passage within the chamber from the upper end thereof downwardly terminating adjacent the lower end of the chamber in the down current of liquid acting to create suction which ejects air or gas from the chamber.

8. An indicator for wet hose liquid dispensing apparatus comprising a hollow transparent casing, open at top and bottom, a closure for each end, means connecting both closures acting to clamp the casing therebetween thus forming a transparent chamber, an inlet conduit in the lower closure terminating in an upwardly directed orifice disposed substantially centrally of the lower portion of the chamber acting to direct the liquid against the upper closure from where it flows downwardly, an outlet conduit in the lower closure to receive the down flow of liquid and a conduit extending downwardly from the top of the chamber terminating adjacent the lower end thereof in the down flow of liquid acting to create suction which acts to extract air or gas from the chamber.

9. An indicator for wet hose liquid dispensing apparatus comprising a hollow transparent cylinder having its axis vertical, a closure at the top and bottom thereof, means connecting the closures acting to clamp the cylinder therebetween, an inlet conduit in the lower closure entering horizontally and terminating in an upwardly directed orifice disposed substantially centrally of the lower end of the chamber acting to direct the liquid against the upper closure from where it flows downwardly, an outlet conduit in the lower closure to receive the down flow of liquid and an ejector extending from the upper end of the chamber downwardly terminating adjacent the lower end of the chamber in the down flow of liquid acting to extract air or gas from the chamber.

10. An indicator for wet hose liquid dispensing apparatus comprising an open ended transparent casing, a closure at the top and bottom thereof to form a visible chamber through which the liquid flows, an inlet conduit in the lower closure terminating in an upwardly directed orifice acting to direct the liquid against the upper closure from where it flows downwardly, an outlet conduit in the bottom closure to receive the down flow of liquid, a recess in the upper closure above and adjoining the chamber, an ejector tube extending from a point within the recess downwardly terminating adjacent the lower end of the casing in the down flow of liquid acting to extract air or gas from the chamber.

11. An indicator for wet hose liquid dispensing apparatus comprising a casing having a visible chamber through which the liquid passes, an inlet conduit terminating in an orifice acting to direct the liquid upward into contact with the top of the chamber from where it flows downwardly, an outlet conduit which receives the down flow of liquid and means forming a passage from the top of the chamber downwardly terminating in the down flow of liquid acting to create suction to extract air or gas from the chamber.

12. The combination with an enclosure having an inlet and an outlet, the upper portion of the enclosure being in position to collect entrapped air from liquid flowing through said inlet into said enclosure, and an ejector tube extending from said upper portion of said enclosure toward said outlet, said tube having an outlet opening in the liquid current flow to effect suction at the inlet end of said tube located in the said upper portion of said enclosure.

13. The combination of an enclosure having an inlet and an outlet and an inner upper portion in which entrapped air in incoming liquid may accumulate, and an ejector tube having an inlet opening in said inner upper portion and an outlet tube in the path of the outflowing liquid to produce suction in said tube to eliminate the tendency for such accumulating air to form an air pocket.

14. The combination with dispensing apparatus having a discharge pipe and a dispensing hose, of a sight gauge located between said pipe and said hose, and an ejector tube in said gauge with an inlet opening in the upper portion of the gauge and an outlet opening in the path of liquid flowing into said hose.

15. In a sight gauge for liquid dispensing apparatus, the combination with an enclosure having an inlet and an outlet and a transparent wall, and means associated with said outlet for ejecting through said outlet accumulated gases in the upper portion of said enclosure.

16. The combination with a standpipe for dispensing apparatus, of a sight gauge at the top of said pipe and having an outlet opening adapted to be connected to a dispensing hose, and an ejector tube having an inlet opening located in the upper portion of said sight gauge and an outlet opening in the path of flow of liquid through the outlet opening for the said dispensing hose.

17. The combination with a sight gauge adapted to be positioned at the top of a priming column of dispensing apparatus and having a liquid discharge, said sight gauge having a closed top, and means associated with said discharge for ejecting accumulating air in said gauge while said top remains closed.

18. The combination with a sight gauge having a liquid discharge, of means for keeping said sight gauge entirely filled with liquid while the liquid is flowing therethrough, means automatically operated by the flow of liquid from said liquid discharge for withdrawing air from said gauge, and a device within said gauge to indicate flow while said sight gauge remains filled with liquid and liquid is flowing therethrough.

19. The combination with dispensing apparatus comprising a liquid discharge pipe, of a sight gauge at the upper end thereof, a dispensing hose connected to an outlet in said sight gauge, and means associated with said discharge pipe for ejecting air from the upper portion of said gauge into said hose, to maintain the sight gauge filled with liquid.

20. The combination with dispensing apparatus comprising a discharge pipe, of a sight gauge at the upper end thereof, a dispensing hose connected to the outlet opening in said gauge, and an ejector tube extending from the upper portion of said gauge into said hose.

21. The combination of a sight gauge having a top, and means rigidly connected to said top and depending therefrom, said means being associated with said liquid discharge for withdrawing air from said gauge.

22. The combination with a sight gauge, of a non-movable means mounted in said gauge for withdrawing air therefrom, and movable means operable by flowing liquid to indicate such flow while the gauge is maintained full of liquid by elimination of air by said air ejector.

23. The combination with a sight gauge, of a discharge pipe connected to the bottom of said sight gauge, and an ejector tube extending from the upper portion of said sight gauge into said discharge pipe.

24. The combination with a sight gauge, of a discharge pipe forming a non-restricted passage-way, means affording an outlet passageway from said sight gauge to said discharge pipe, and an air conduit extending from the upper portion of said sight gauge into said discharge pipe.

25. The combination with a sight gauge having a liquid discharge, and means entirely enclosed by the sight gauge and having a portion associated with said liquid discharge for ejecting gases from the gauge upon the flow of liquid from said discharge.

26. The combination with an elevated enclosure having an inlet and an outlet in its lower portion, an immovable tube extending from the upper portion of the enclosure into said outlet, said tube communicating at its upper end with the upper portion of the enclosure and communicating at its lower end with said outlet.

27. In a device of the class described, a hollow, vertical, transparent body having open upper and lower ends, upper and lower heads closing the ends thereof, said lower head having liquid inlet and outlet openings spaced from each other, whereby air or gas carried by said liquid collects beneath said upper head, and suction means for automatically withdrawing said air or gas thus collected upon the passage of liquid into said device at the inlet opening and out at said outlet opening.

28. A device of the class described comprising, a vertical, transparent, hollow body member open at both ends, an upper head closing the upper end of said member having a recess in its under side, a lower head closing the lower end of said body member having an inlet opening and an outlet opening spaced therefrom whereby liquid may pass into the device and out thereof, air or gas in said liquid collecting below the upper head in the recess, said recess being of varying depth, and a pipe of small diameter attached to and depending from the upper head and extending at its lower end substantially centrally into said outlet opening whereby outflowing liquid surrounds the lower end of the pipe, said pipe being located in a deeper portion of the recess and having an opening in its side for the purposes described.

In testimony whereof I have hereunto set my hand.

LYON McCANDLESS.